United States Patent
Kono et al.

(10) Patent No.: US 10,266,050 B2
(45) Date of Patent: Apr. 23, 2019

(54) FUEL SUPPLY DEVICES

(71) Applicant: AISAN KOGYO KABUSHIKI KAISHA, Obu-shi, Aichi-ken (JP)

(72) Inventors: Takuya Kono, Nagoya (JP); Koji Yoshida, Kasugai (JP); Tatsuki Fukui, Nagoya (JP); Shinya Higashi, Kasugai (JP); Yuichi Murakoshi, Inazawa (JP); Takayuki Kondo, Inazawa (JP); Akihiro Yano, Obu (JP); Kensuke Niwa, Nagoya (JP); Hidetomo Ishida, Nagoya (JP)

(73) Assignee: AISAN KOGYO KABUSHIKI KAISHA, Obu-Shi, Aichi-Ken (JP)

( * ) Notice: Subject to any disclaimer, the term of this patent is extended or adjusted under 35 U.S.C. 154(b) by 157 days.

(21) Appl. No.: 15/505,330

(22) PCT Filed: Aug. 10, 2015

(86) PCT No.: PCT/JP2015/072656
§ 371 (c)(1),
(2) Date: Jul. 20, 2017

(87) PCT Pub. No.: WO2016/031542
PCT Pub. Date: Mar. 3, 2016

(65) Prior Publication Data
US 2017/0341510 A1    Nov. 30, 2017

(30) Foreign Application Priority Data
Aug. 26, 2014   (JP) .................................. 2014-171442

(51) Int. Cl.
*B60K 15/077*   (2006.01)
*F02M 37/10*   (2006.01)
(Continued)

(52) U.S. Cl.
CPC ............ *B60K 15/077* (2013.01); *B60K 15/05* (2013.01); *B60K 15/061* (2013.01);
(Continued)

(58) Field of Classification Search
CPC .. B60K 2015/03217; B60K 2015/0772; B60Y 2400/3019; F02D 33/003;
(Continued)

(56) References Cited

U.S. PATENT DOCUMENTS 4,750,513 A * 6/1988 Griffin ................. B60K 15/077
137/316
5,211,547 A * 5/1993 Gaston ................... F02M 37/10
248/215

(Continued)

FOREIGN PATENT DOCUMENTS

JP   11-264353 A   9/1999
JP   11-264355 A   9/1999
(Continued)

OTHER PUBLICATIONS

Japanese Office Action dated Jul. 28, 2017, for Japanese Application No. 2014-171442 (6 p.).

(Continued)

*Primary Examiner* — Marguerite J McMahon
*Assistant Examiner* — Teuta B Holbrook
(74) *Attorney, Agent, or Firm* — Conley Rose, P.C.

(57) ABSTRACT

A fuel supply device has a cover member which is attached to an opening portion of a fuel tank and a pump unit comprising a pump. The cover member and pump unit are connected via a connecting portion where the pump unit is rotatably connected to the connecting portion. Further, the fuel supply device includes a fuel residual amount detection device which is attached to the pump unit and configured to detect the residual amount of fuel. The fuel residual amount (Continued)

detection device includes a gauge main body to which electric wirings are connected, an arm portion which is movably mounted relative to the gauge main body and a float which is attached to a leading end of the arm portion. The float is positioned above a lower terminal end of the base portion when the cover member is held and lifted while the pump unit rotates with respect to the connecting portion.

11 Claims, 12 Drawing Sheets

(51) Int. Cl.
- *G01F 23/36* (2006.01)
- *G01F 23/76* (2006.01)
- *B60K 15/05* (2006.01)
- *F02M 37/00* (2006.01)
- *B60K 15/06* (2006.01)
- *F02D 33/00* (2006.01)
- *B60K 15/03* (2006.01)

(52) U.S. Cl.
CPC ....... *F02D 33/003* (2013.01); *F02M 37/0076* (2013.01); *F02M 37/10* (2013.01); *G01F 23/36* (2013.01); *G01F 23/76* (2013.01); *B60K 2015/03217* (2013.01); *B60K 2015/0772* (2013.01); *B60Y 2400/3019* (2013.01)

(58) Field of Classification Search
CPC .... F02M 37/0076; F02M 37/10; G01F 23/36; G01F 23/76
USPC ......................................... 123/495, 497, 509
See application file for complete search history.

(56) References Cited

U.S. PATENT DOCUMENTS

| | | | | |
|---|---|---|---|---|
| 5,272,918 A * | 12/1993 | Gaston | ................... | F02M 37/10 73/290 R |
| 6,000,913 A | 12/1999 | Chung et al. | | |
| 6,230,690 B1 * | 5/2001 | Umetsu | ................ | B60K 15/077 123/509 |
| 6,308,733 B2 * | 10/2001 | Murakoshi | ........... | B60K 15/077 123/509 |
| 6,609,503 B1 * | 8/2003 | Nakagawa | ................ | B62J 35/00 123/509 |
| 6,716,000 B2 * | 4/2004 | Appleton | ............. | F02M 37/103 123/509 |
| 6,837,222 B2 * | 1/2005 | Okazono | .............. | F02M 37/103 123/509 |
| 6,941,808 B2 * | 9/2005 | Gouzou | ................ | F02M 37/103 73/290 R |
| 6,966,305 B2 * | 11/2005 | Aubree | ................ | F02M 37/103 123/497 |
| 7,757,672 B2 * | 7/2010 | Villaire | ................ | F02M 37/106 123/509 |
| 2001/0054446 A1 * | 12/2001 | Reiter | .................. | B60K 15/035 137/587 |
| 2003/0102035 A1 * | 6/2003 | Dasilva | .............. | F02M 37/0082 137/565.34 |
| 2004/0020289 A1 | 2/2004 | Gouzou et al. | | |
| 2004/0060547 A1 * | 4/2004 | Aubree | ................ | F02M 37/103 123/497 |
| 2006/0260696 A1 * | 11/2006 | Leymarie | ............ | B60K 15/077 137/565.17 |
| 2006/0272619 A1 * | 12/2006 | Yamashita | ........... | F02M 37/103 123/509 |
| 2007/0125344 A1 * | 6/2007 | Troxler | .................. | B60K 15/03 123/509 |

FOREIGN PATENT DOCUMENTS

| | | |
|---|---|---|
| JP | 2006-009729 A | 1/2006 |
| JP | 2012-184760 A | 9/2012 |
| JP | 2012184760 A * | 9/2012 |

OTHER PUBLICATIONS

English Translation of Japanese Office Action dated Jul. 28, 2017, for Japanese Application No. 2014-171442 (6 p.).
International Patent Application No. PCT/JP2015/072656 International Search Report dated Nov. 10, 2015 (5 pages).

* cited by examiner

FUEL SUPPLY DEVICES

CROSS-REFERENCE TO RELATED APPLICATIONS

The present application is a National Phase entry of, and claims priority to, PCT Application No. PCT/JP2015/072656, filed Aug. 10, 2015, which claims priority to Japanese Patent Application No. 2014-171442, filed Aug. 26, 2014, both of which are incorporated herein by reference in their entireties for all purposes.

STATEMENT REGARDING FEDERALLY SPONSORED RESEARCH OR DEVELOPMENT

Not applicable.

BACKGROUND

The present disclosure relates to a fuel supply device. In particular, the disclosure relates to a fuel supply device for supplying fuel within a fuel tank to an internal combustion engine, wherein the fuel supply device is mounted to a vehicle, e.g. an automobile.

Fuel supply devices attached to fuel tanks are widely known in the art. It is also widely known that a part of these fuel supply devices can be inserted into an opening formed in an upper surface portion of the fuel tank, where the device is attached to the opening when the fuel supply devices are mounted to the fuel tank. Further, as disclosed in a Japanese Laid-Open Patent Publication No. 2012-184760 (hereinafter referred to as 760 Publication), a pump unit rotatably provided to a fuel supply device is also known. Further, in order to detect the residual amount of fuel stored in the fuel tank, it is also known to attach a fuel residual amount detection device i.e., a center gauge to the pump unit.

BRIEF SUMMARY

However, the prior art disclosed in 760 Publication can still be further improved. According to the fuel supply device disclosed in 760 Publication, the fuel residual amount detection device may strike a bottom surface portion or an edge around an opening portion of the fuel tank, when the fuel supply device is attached to the fuel tank. However, if the fuel residual amount detection device deforms as the fuel residual amount detection device strikes against the fuel tank, the fuel residual amount detection device will not likely perform its expected function.

Therefore, there is a valid need for an undamaged configuration which prevents a fuel residual detection device, which comprises part of a fuel supply device, from striking against a fuel tank.

According to one aspect of the present invention, a fuel supply device comprises a cover member which is attached to an opening portion of a fuel tank as well as a pump unit having a pump. The cover member and pump unit are connected via a connecting portion, where the pump unit is rotatably connected to the connecting portion. In addition, the fuel supply device includes a fuel residual amount detection device attached to the pump unit and configured to detect the residual amount of fuel. This fuel residual amount detection device includes a gauge main body to which electric wirings are connected, an arm portion which is movably mounted relative to the gauge main body, and a float which is attached to a leading end of the arm portion. The float is positioned above a lower terminal end of a base portion when the cover member is held and is lifted while the pump unit is rotatable with respect to the connecting portion.

As a consequence of the base portion at the pump unit abutting the fuel tank, the float constituting an element of the fuel residual amount detection device is prevented from abutting the fuel tank. As a result, it is possible to prevent breakage of the float and deformation of the arm portion, so that the fuel residual amount detection device can perform its expected function.

According to another aspect of the present invention, the connecting portion connects the pump unit and the cover member so that the distance therebetween can be changed by moving at least one part of the connecting portion.

The cover member is further pushed to move downwardly after the pump unit abuts the fuel tank. For this purpose, the pump unit is configured such that it can be easily pressed against the fuel tank. According to the fuel supply device with this configuration, since the float portion is prevented from being abutted to the bottom surface portion of the fuel tank, it would allow the cover member to be attached quickly to the fuel tank without worrying about damage to the float portion. Moreover, it would allow the pump unit to be fixed to the bottom surface portion of the fuel tank.

According to another aspect of the present invention, the pump unit is movably connected relative to a connecting portion while a connecting shaft which may be formed in either one of the connecting portion or the pump unit, is inserted into a connecting hole, which is formed in the other.

Thus, the connecting shaft can move with the connecting hole being contacted when the pump unit moves relative to the connecting portion. Consequently, the pump unit may move in a swinging motion. Accordingly, the pump unit may move while a contact position of the fuel tank with respect to the bottom portion is changed. Even with this configuration, since the float portion is prevented from being abutted to the bottom surface portion of the fuel tank, it would allow the cover member to be attached quickly to the fuel tank without worrying about damage to the float portion. In addition, it would allow the pump unit to be fixed to the bottom surface portion of the fuel tank.

According to another aspect of the present invention, the pump unit includes a protruding portion extending in a direction intersecting the bottom surface of the pump unit. The gauge main body is prevented from being abutted to the edge around the opening portion as the protruding portion restricts a movable range of the pump unit, which is disposed within the circular opening portion of the fuel tank.

Therefore, the gauge main body is prevented from being struck against the edge around the opening portion of the fuel tank. Accordingly, it may be possible to suppress a failure of the fuel residual amount detection device.

According to another aspect of the present invention, the fuel supply device has a cover member attached to an opening portion of the fuel tank and a pump unit with a pump. The cover member and pump unit are connected via a connecting portion while the pump unit is rotatably connected to the connecting portion. Further, the fuel supply device includes a fuel residual amount detection device which is attached to the pump unit and configured to detect the residual amount of fuel. The fuel residual amount detection device includes a gauge main body to which electric wirings are connected, an arm portion which is movably mounted relative to the gauge main body, and a float which is attached to a leading end side of the arm portion. The pump unit includes a protruding portion extending in a direction intersecting the bottom surface of the pump unit. The gauge main body is prevented from being abutted to the edge around the opening portion as the protruding portion restricts a movable range of the pump unit, which is disposed within the circular opening portion of the fuel tank.

Therefore, the gauge main body so restricted is prevented from being struck against the edge around the opening portion of the fuel tank. Accordingly, it may be possible to suppress a potential failure of the fuel residual amount detection device.

According to another aspect, the gauge main body is attached to a lateral surface of the protruding portion which is provided at the pump unit. The protruding portion is placed in a position closer to an outer circumferential side of the base portion than the gauge main body.

Consequently, the protruding portion serves to prevent the gauge main body from being abutted to the edge around the opening portion. In addition, the protruding portion can be effectively used since the protruding portion is used for mounting the gauge main body.

According to another aspect, the gauge main body is attached to a lateral surface of the protruding portion which is provided at the pump unit. The protruding portion has a cover portion and the gauge main body is disposed between the cover portion and the base portion.

Therefore, the protruding portion serves to prevent the gauge main body from being abutted to the edge around the opening portion. In addition, because the protruding portion has the cover portion, it may be possible to suppress the protruding height of the protruding portion from the base portion.

DETAILED DESCRIPTION

Figure 1:
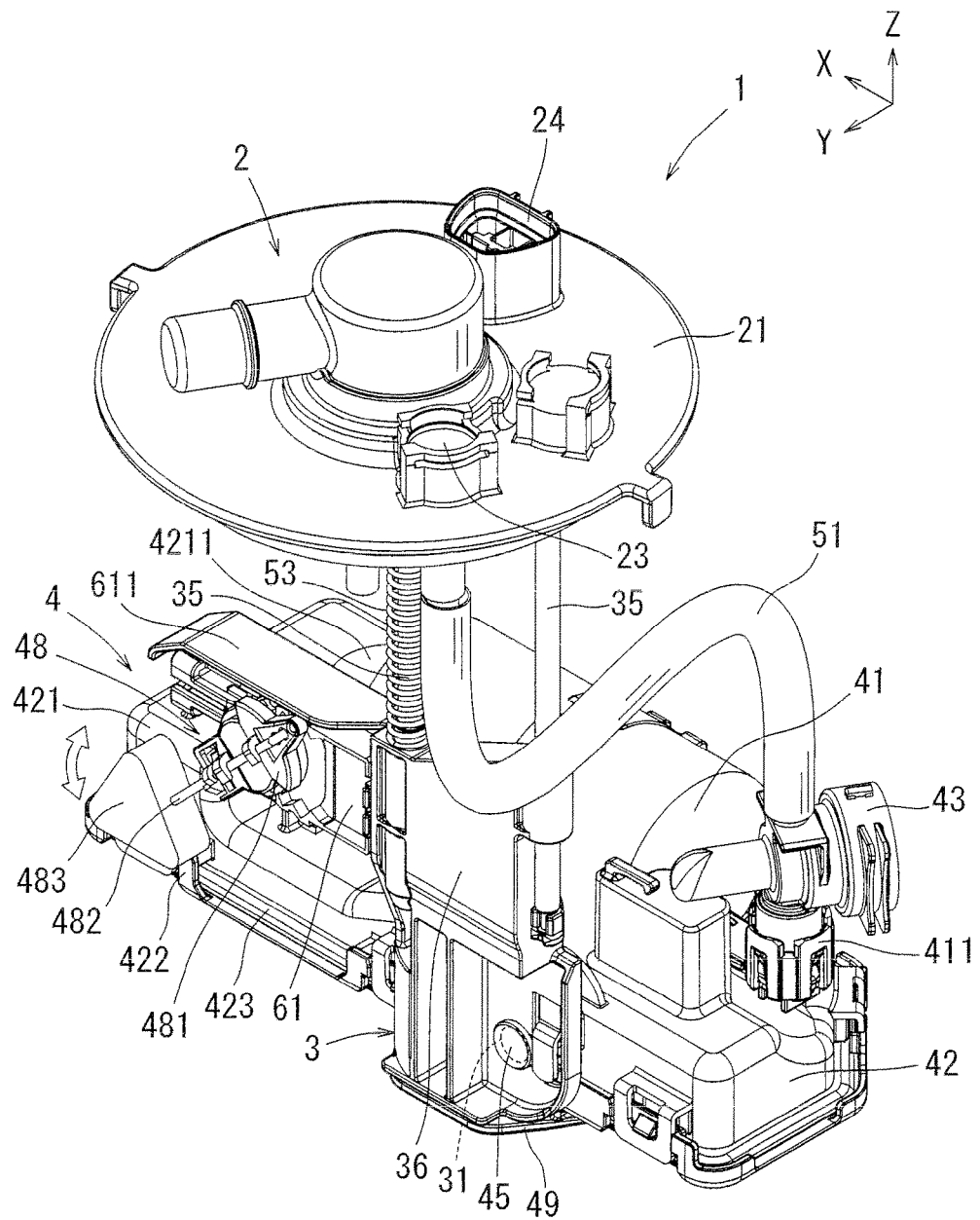
FIG. 1 is a perspective view of a fuel supply device according to one embodiment.

One exemplary embodiment of the present invention will now be described with reference to the drawings as follows. The forward and backward directions, upward and downward directions, as well as the leftward and rightward directions in the present specification are determined such that X is a forward direction, Y is a leftward direction and Z is an upward direction as shown in FIG. 1 etc., where the backwards, upwards, and downwards directions extend in the negative direction of X, Y, and Z, respectively. For example, usually, a cover member 2 of a fuel supply device 1 is positioned at an upper side and a pump unit 4 is positioned at a lower side. A rotary shaft of the pump unit 4 extends in the leftward and rightward directions. The forward and backward directions are orthogonal to the leftward and rightward directions as well as the upward and downward directions.

The fuel supply device 1 according to the present embodiment may be mounted on a vehicle, such as an automobile. The fuel supply device 1 is attached to a fuel tank 7 (FIG. 2) arranged below a floor of the vehicle. The fuel supply device 1 is used to feed liquid fuel stored within the fuel tank 7 into an internal combustion engine (not shown).

Figure 2:
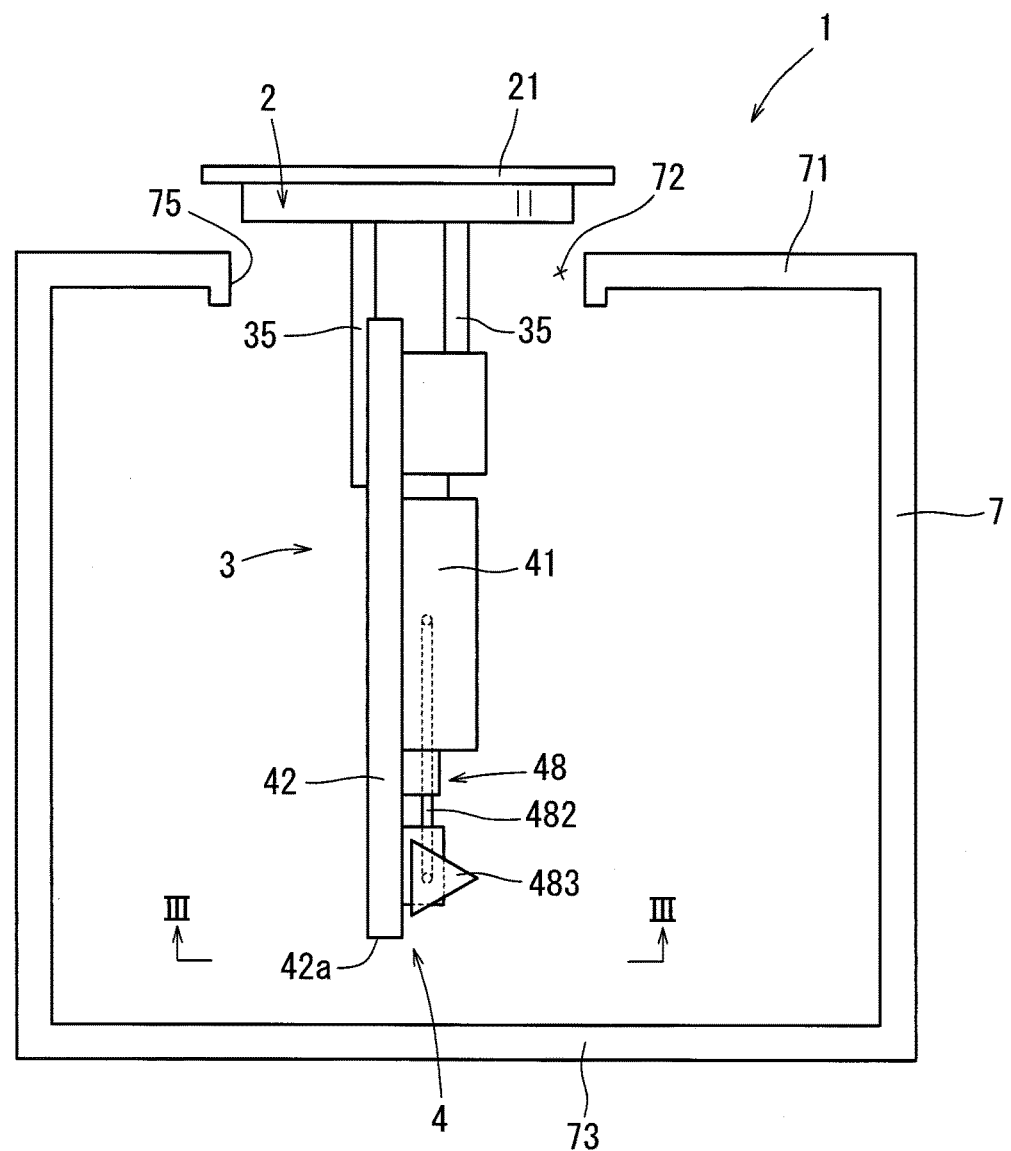
FIG. 2 is a schematic view illustrating in a state wherein the fuel supply device of FIG. 1 is inserted into a fuel tank.

As shown in FIGS. 1 and 2, the fuel supply device 1 according to the present embodiment includes a cover member 2 attached to an opening portion 72 which is provided within an upper surface portion 71 of the fuel tank 7, and a pump unit 4 having a pump 41 which is used to deliver fuel stored in the fuel tank 7 to the outside of the fuel tank (e.g., to the engine). Furthermore, the fuel supply device 1 includes a connecting portion 3 used for connecting the cover member 2 with the pump unit 4 and a fuel residual amount detection device 48 which detects the amount of residual fuel stored in the fuel tank 7. The pump unit 4 is placed at a bottom surface portion 73 of the fuel tank 7 and the cover member 2 is attached to the opening portion 72 of the fuel tank 7. The cover member 2 can close the opening portion 72 of the fuel tank 7 and press the pump unit 4 in touching contact along the bottom surface portion 73 of the fuel tank 7.

The cover member 2 includes a set plate portion 21 which covers the opening portion 72 of the fuel tank 7. An outlet port 23 is provided on the substantially disk-shaped set plate 21 for leading fuel delivered from the pump unit 4 to the outside of the fuel tank 7. Further, the set plate portion 21 includes an electric connector 24 for connecting electric wiring. The opening portion 72 normally has a circular shape, and the set plate portion 21 has a substantially circular shape in plan view, which is concentric with and thus corresponds to the shape of the opening portion 72. A ring made of resin (not shown) is attached to the opening portion 72 to fill a clearance between the fuel tank 7 and the cover member 2 in order to reduce or eliminate the clearance.

The connecting portion 3 shown in FIGS. 1 and 2 is configured to be telescopic. The connecting portion 3 includes a rod member 35 attached to the cover member 2 and a joint portion 36 which is movable along the length of rod member 35. The rod member 35 extends orthogonal to the plane in which the set plate portion 21 extends radially. Further, a spring member 53 that can exert elastic force is arranged between the joint portion 36 and the cover member 2. The spring member 53 biases the cover member 2 to move away from the pump unit 4 whenever the cover member 2 and the pump unit 4 are closer than a predetermined distance. In this manner, the spring member 53 is compressed whenever the cover member 2 is moved towards the bottom surface portion 73 of the fuel tank 7 from an existing state so that the bottom surface of the pump unit 4 contacts the bottom surface portion 73 of the fuel tank 7. As long as this compressed state of the spring member 53 is maintained, the pressed state of the pump unit 4 against the bottom surface portion 73 will be maintained. In particular, biasing force from the compression of the spring 53 is transmitted downward from the connecting portion 3 to a connected engagement portion 49 which is provided at the pump unit 4 which presses the engagement portion 49 against the bottom surface portion 73 of the fuel tank 7.

As shown in FIGS. 1 and 2, the pump unit 4 is arranged below the cover member 2. The pump unit 4 includes the pump 41 used for feeding fuel and a base portion 42 used for mounting the pump 41. The base portion 42 has a substantially planar shape and is arranged so that one side surface of the base portion 42 faces the bottom surface portion 73 of the fuel tank 7. The base portion 42 may also be referred to as a fuel reservoir or a sub-tank etc. The base portion 42 includes an upper base 421 to which the pump 41 is attached, a lower base 422 which is a side surface that faces and contacts the bottom surface portion 73 of the fuel tank 7, and a filter member 423 which is interleaved between the upper base 421 and the lower base 422. The upper base 421 is provided with a suction port 4211 to be connected with the pump 41 and configured such that the fuel passed through the filter member 423 can be sucked by the pump 41.

Figure 3:
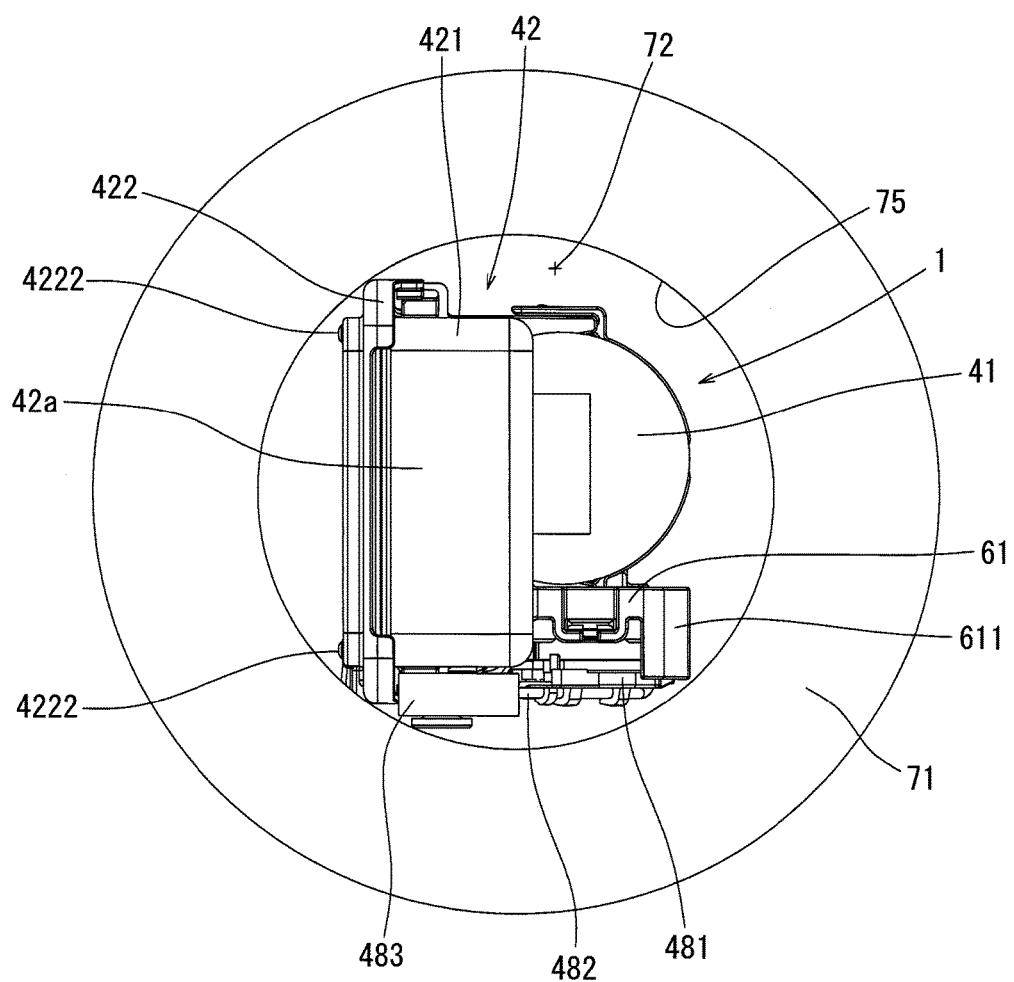
FIG. 3 is a cross-sectional view taken along line in FIG. 2 for illustrating a relationship between a pump unit and an opening portion of the fuel tank.

The lower base 422 has an opening (bottom surface opening) (not shown) with a lattice. The lower base 422 is provided with leg portions 4222 as shown in FIG. 3 so that the fuel can be sucked from the bottom surface opening even when the lower base 422 is abutting the bottom surface portion 73 of the fuel tank 7. Further, an outer periphery of the upper base 421 is of a similar shape but smaller than an outer periphery of the lower base 422. A clearance is thus formed between the upper base 421 and the lower base 422 when the filter member 423 is not interleaved. The clearance can serve to introduce fuel into the base portion 42. In this embodiment, instead of interleaving, one side surface of the upper base 421 is arranged so as to be covered by the filter member 423. As a result, the fuel entering from the clearance into the base portion 42 also reaches the pump 41 through the filter member 423.

A pressure adjusting valve 43, that is used for adjusting liquid feed pressure of the fuel, is attached to the pump unit 4. The pressure adjusting valve 43 is attached to a valve supporting portion extending from the pump 41. The fuel with adjusted pressure by the pressure adjusting valve 43 is fed to the internal combustion engine, for example, via a hose 51 and the outlet port 23.

As shown in FIGS. 1 and 2, the fuel residual amount detection device 48 is attached to the base portion 42 of the pump unit 4. For example, it may be attached to the upper base 421 of the base portion 42. The fuel residual amount detection device 48 includes a gauge main body 481 to which electric wirings are connected, an arm portion 482 which is movably mounted to the gauge main body 481, and a float 483 which is attached to a free end of the arm portion 482. The float 483 can move as indicated by a void arrow in FIG. 1, where the position of the float 483 is determined in accordance with the liquid level of fuel. Consequently, the position of the arm portion 482 is determined in accordance with the position of the float 483. According to relative position of the arm portion 482 to the gauge main body 481, the electric resistance value of the gauge main body 481 is then determined so that ultimately fuel residual amount can be detected.

As shown in FIG. 1, the connecting shaft 45 provided through the pump unit 4 is inserted in the connecting hole 31 formed in the connecting portion 3, and extends through the pump unit 4 to connect the connecting portion 3 with the pump unit 4. Consequently, the connecting portion 3 and the pump unit 4 are connected via the connecting shaft 45 in a relative movable manner. Thus, referring to FIG. 2, the pump unit 4 rotates relative to the connecting portion 3 about the connecting shaft 45 when the fuel supply device 1 is lifted while the cover member 2 is held. At this time, one end 42a of the base portion 42 of the pump unit 4 faces the bottom surface portion 73 of the fuel tank 7. The fuel residual amount detection device 48 is positioned above the one end 42a of the base portion 42.

Referring to known conventional art, for commonly known fuel residual amount detection devices, if the float corresponding to float 483 of FIG. 1 in such a known fuel residual amount detection device is positioned below one end of a pump unit's base facing the bottom of a fuel tank into which the device is inserted, then when the fuel supply device is lifted, the float 483 often strikes against the bottom surface portion of the fuel tank, which can result in damage. However, in contrast, according to the present embodiment, the fuel residual amount detection device 48 is positioned above the one end 42a of the base portion 42 when the fuel supply device 1 is lifted. Therefore, unlike the commonly known art, it is not the fuel residual amount detection device 48 that abuts the bottom surface portion 73 of the fuel tank 7, but rather the base portion 42. In this way, after the base portion 42 abuts the fuel tank 7 while being inserted, the lower base 422 gradually contacts and slides along the fuel tank 7. As a result, the fuel residual amount detection device 48 which is mounted on the upper base 421 is prevented from being urged to strike against the bottom surface portion 73 of the fuel tank 7. As a result, damage to the fuel residual amount detection device 48 and the arm portion 482, that is caused by the strike of the float 483 against the fuel tank 7 can be avoided.

In the present embodiment, the float 483 and the arm portion 482 are prevented from striking against the bottom surface portion 73 of the fuel tank 7 because the movable ranges of the float 483 and the arm portion 482 are restricted so as to not strike against and move past the bottom surface of the lower base 422.

As shown in the bottom view of FIG. 3, referring to the fuel supply device 1, a risk of failure that may be caused when the pump unit 4 is inserted in the opening portion 72 may also be considered. Specifically, the fuel supply device 1 may adopt a configuration which can prevent the gauge main body 481 of the fuel residual amount detection device 48 from striking against the edge 75 near the opening portion 72 of the fuel tank 7 when the pump unit 4 is inserted into the fuel tank 7. More specifically, a protruding portion 61 is provided at the pump unit 4, which extends outward in leftward-and-rightward direction farther than the fuel residual amount detection device 48 in a state as shown in FIG. 3. The protruding portion 61 extends orthogonal to a plane in which the bottom surface of the pump unit 4 extends in order to restrict the movable range of the pump unit 4 in the left-to-right direction. Consequently, it prevents the gauge main body 48 from abutting the edge 75 around the opening portion 72.

As shown in FIG. 1, a substantially planar mounting portion is provided such that it extends from the upper base 421 of the base portion 42 of the pump unit 4, for mounting the gauge main body 481. The mounting portion includes the protruding portion 61 extending in a direction orthogonal to the plane in which the bottom surface of the pump unit 4 extends. As shown in FIG. 3 the mounting portion including the protruding portion is configured to prevent the gauge main body 481 from striking against the edge 72 around the opening portion 72. In further detail, the mounting portion in a state as shown in FIG. 3 is positioned further radially outward than the gauge main body 481 and is thus closer to the edge 75 around the opening portion 72 than the gauge main body 481. As shown in FIG. 1, the mounting portion may also comprise a cover portion 611. The cover portion 611 is disposed closer to the cover member 2 than the fuel residual amount detection device 48 when the fuel supply device 1 is mounted to the fuel tank 7. Consequently, the fuel residual amount detection device 48, which is farther, is positioned between the cover portion 611 and the base portion 42. The protruding portion 61 extends from the base portion 42 in a direction orthogonal to the bottom surface of the base portion 42 and includes the cover portion 611 which extends parallel to the bottom surface of the base portion 42. In other words, the protruding portion 61 is configured in an upside-down L-shape as seen from a side view.

According to the present embodiment, the protruding portion 61 is configured such that its cover portion 611 can abut the edge 75 around the opening portion 72, which restricts the movable range of the connected pump unit 4, which is positioned within the opening portion 72. More particularly, in the state shown in FIG. 3, the cover portion 611 is positioned further radially outward than the gauge main body 481 and is closer to the edge 75 around the opening portion 72 than the gauge main body 481. Since the movable range of the pump unit 4 is restricted in this way, this also prevents the gauge main body 481 positioned within the opening portion 72 from abutting the edge 75 around the opening portion 72.

Figure 4:
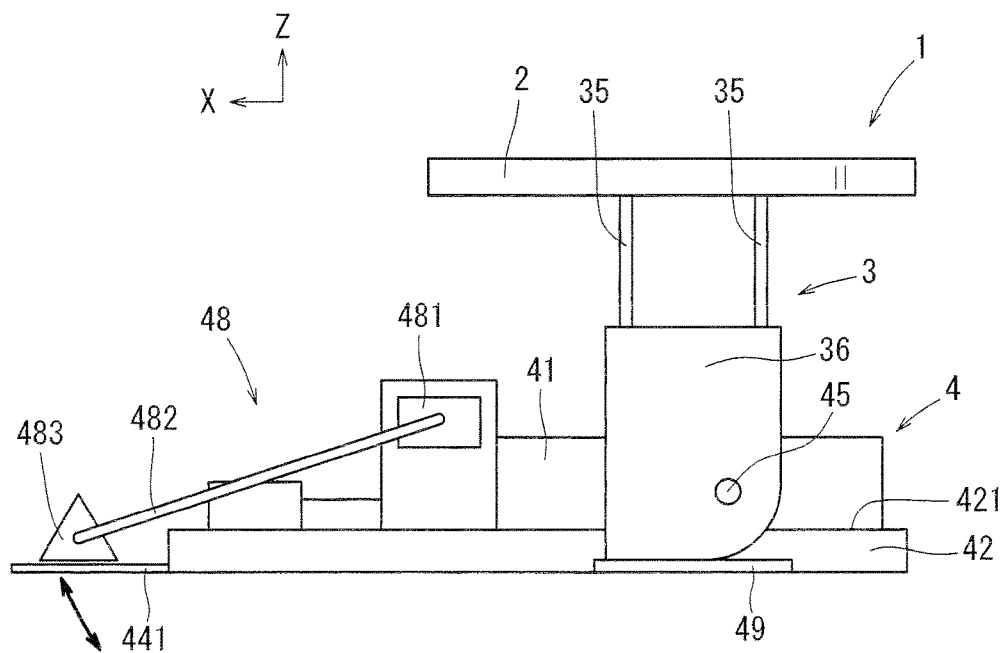
FIG. 4 is a schematic left side view of a fuel supply device according to another embodiment.
Figure 5:
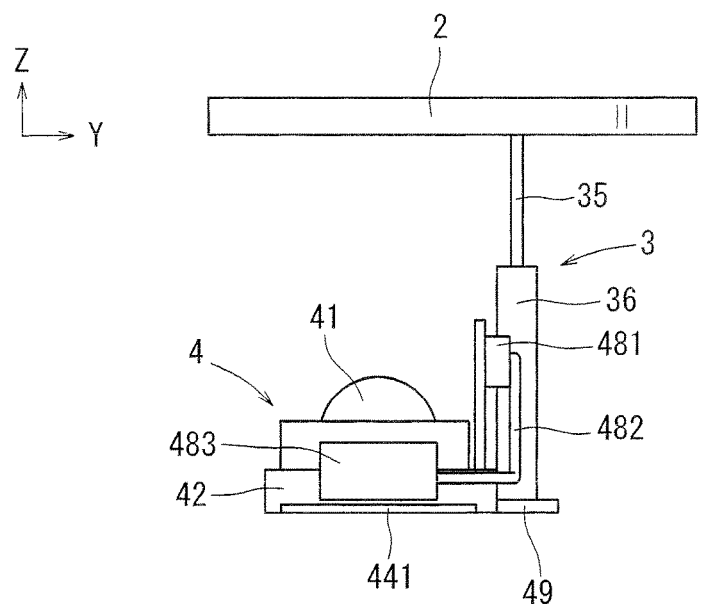
FIG. 5 is a schematic front view of the fuel supply device of FIG. 4.

The other embodiment shown in FIGS. 4 and 5 will be described as follows. A main difference from the embodiment shown in FIGS. 1 to 3 is that a float protection portion 441 is arranged on a side and extends in front of the base portion 42. Hereinafter, this difference will be mainly described. The embodiment shown in FIGS. 4 and 5 is different from the embodiment shown in FIGS. 1 to 3 in that the plate-like float protection portion 441 is formed to extend toward the front side of the base portion 42 (see FIG. 4 and FIG. 5). Such a float protection portion 441 is also a part of the base portion 42 and is configured such that it abuts the bottom surface portion 73 of the fuel tank 7 prior to the float 483. The float protection portion 441 according to the present embodiment, is a plate-like portion, which extends in the frontal leftward and rightward directions so that the bottom surface of the base portion 42 can be frontally extended. When this portion is formed, the flexibility in arranging and configuring the fuel residual amount detection device 48 can be increased, because with the portion it is not necessary any more to arrange the gauge main body 481 on a rear side or to shorten the arm portion 482 on which the float 483 is mounted.

The distance between a leading end of the float protection portion 441 and a connecting shaft 45 is made to be longer than the distance between a leading end of the float 483 and the connecting shaft 45 to ensure that the float protection portion 441 abuts the bottom surface portion 73 of the fuel tank 7 instead of the float.

According to the embodiment shown in FIGS. 4 and 5, the arm portion 482 is configured to be substantially L-shaped, which allows the float 483 to be arranged in a position horizontally opposed to the pump unit 4. The float protection portion 441 is arranged lower than the upper front end surface of the upper base 421 in order to facilitate the detection of the fuel residual amount. Further, the float protection portion 441 does not need to have a plate-like configuration because it only needs to extend to the extent necessary to prevent the float portion 483 from abutting the bottom surface portion 73 of the fuel tank 7.

Figure 6:
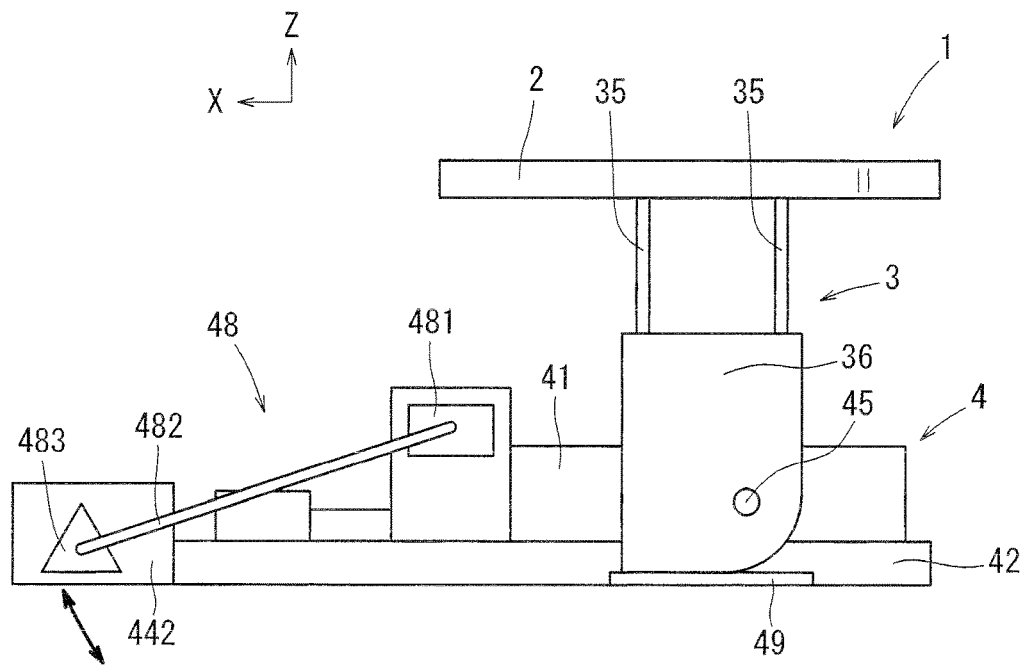
FIG. 6 is a schematic left side view of a fuel supply device according to another embodiment.
Figure 7:
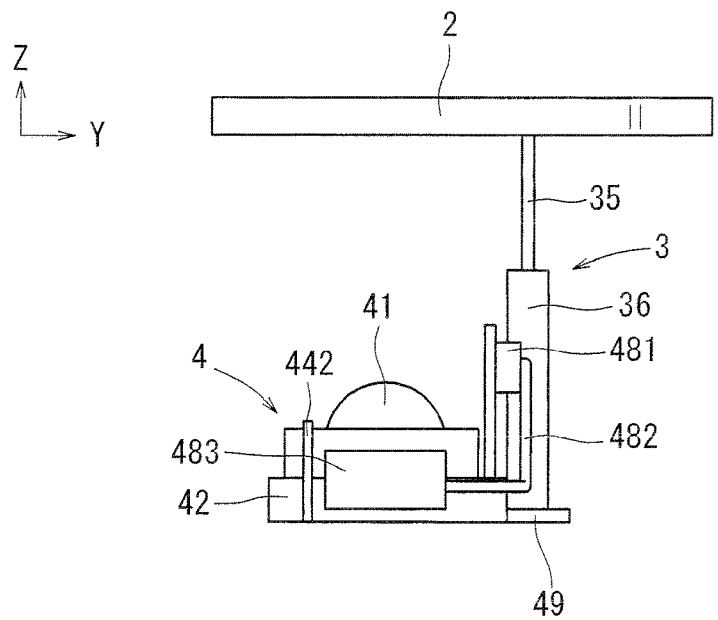
FIG. 7 is a schematic front view of the supply device of FIG. 6.

An additional embodiment shown in FIGS. 6 and 7 will be described as follows. A main difference of this embodiment shown in FIGS. 6 and 7 from the previous embodiment shown in FIGS. 4 and 5 is the arrangement of a float protection portion 442. Hereinafter, this difference will be mainly described. According to the embodiment shown in FIGS. 6 and 7, a plate-like float protection portion 442 extend in the front-vertical plane from the front of the base portion 42 unlike the embodiment shown in FIGS. 1 to 3 (see FIGS. 6 and 7). In addition, the plate-like float protection portion 442 is designed to be able to be arranged at the leftward side of the float 483. The float protection portion 442 is forms a part of the base portion 41 and is configured such that the float protection portion 422 abuts the bottom surface portion 73 instead of the float 483.

According to the configuration of the embodiment shown in FIGS. 6 and 7, fuel in the vicinity of the bottom surface portion 73 of the fuel tank 7 may have a greater chance of being detected compared to the embodiment shown in FIGS. 4 and 5 since the base portion 42 is not arranged below the float 483 in the horizontal leftward-rightward direction. Incidentally, it is not necessary to configure the float protection portion 442 according to the embodiment shown in FIGS. 6 and 7 to have a plate-like configuration either.

The additional embodiment shown in FIGS. 8 and 9 will be described as follows. A main difference between the embodiment shown in FIGS. 8 and 9 and the previous embodiment of FIGS. 4 and 5 as well as the embodiment of FIGS. 6 and 7 is an outer configuration of the float protection portion 443. Hereinafter, this difference will be mainly described. According to the embodiment shown in FIGS. 8 and 9, a bent plate-like float protection portion 443 is formed to extend toward the front side from the front of the base portion 42 unlike the embodiment shown in FIGS. 1 to 3. In addition, the float protection portion 443 is formed such that it covers both the vertical part and the horizontal part of the float 483.

Figure 8:
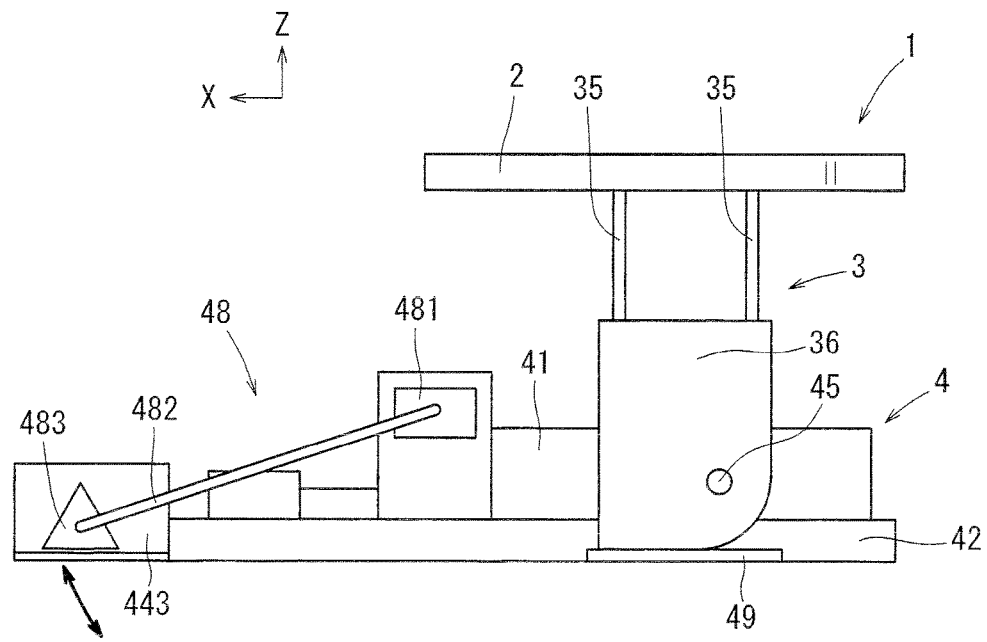
FIG. 8 is a schematic left side view of a fuel supply device according to another embodiment.
Figure 9:
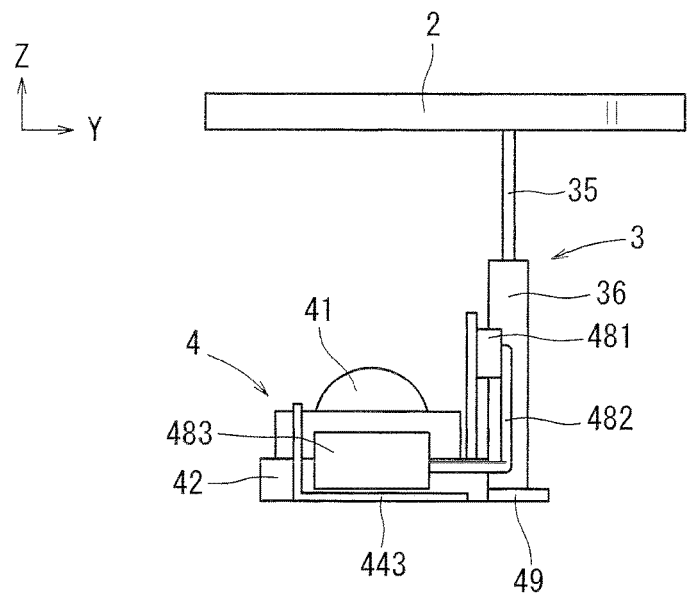
FIG. 9 is a schematic front view of the fuel supply device of FIG. 8.

The float protection portion 443 according to the embodiment shown in FIGS. 8 and 9 is configured to be substantially L-shaped from a side view as seen from the front. Therefore, with this configuration, the float protection member 443 can be strengthened.

The embodiment shown in FIGS. 10 and 11 will be described as follows. A main difference of the embodiment shown in FIGS. 10 and 11 from the embodiment shown in FIGS. 1 to 3 is the arrangement of a float 483. A further difference is the arrangement of a float protection portion 444 at the left side of the base portion 42. Hereinafter, the above-mentioned difference will be mainly described. According to the embodiment shown in FIGS. 10 and 11, the float 483 is formed to extend at the left side of the base portion 42 unlike the other embodiments. Only this configuration prevents the float 483 from abutting the bottom surface portion 73 of the fuel tank 7 through the positional relation between the float 483 and the base portion 42.

Figure 10:
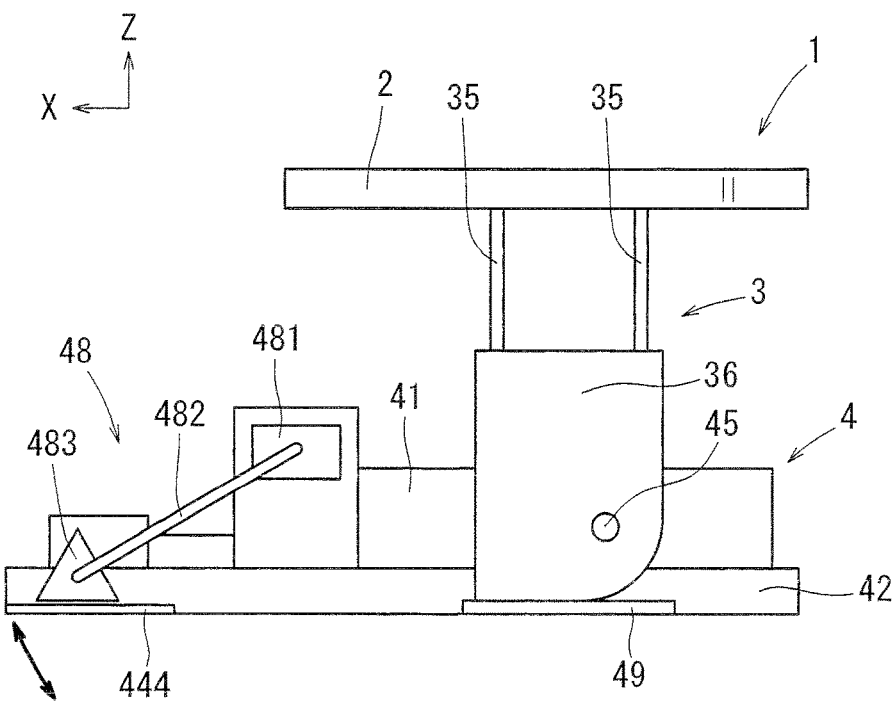
FIG. 10 is a schematic left side view of a fuel supply device according to another embodiment.
Figure 11:
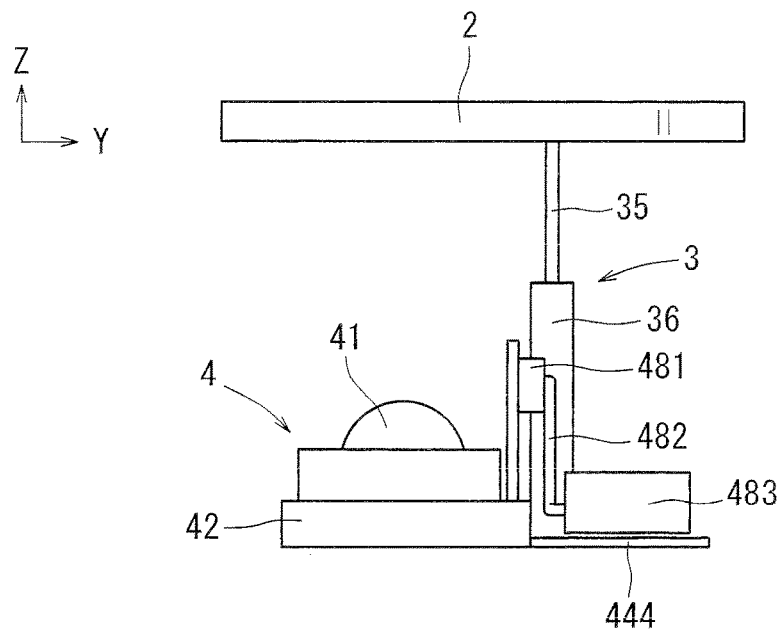
FIG. 11 is a schematic front view of the fuel supply device of FIG. 10.

According to the embodiment shown in FIGS. 10 and 11, the plate-like float protection portion 444 is formed to extend at the left side of the base portion 42 to cover a lower horizontal surface of the float 483. This float protection portion 444 prevents the float 483 from abutting the bottom surface portion 73 of the fuel tank 7 even when the cover member 2 is inclined.

The embodiment shown in FIG. 12 will be described as follows. A main difference from the embodiment shown in FIGS. 1 to 3 is the arrangement of a fuel residual amount detection device 48, and therefore, this difference will be mainly described as follows. According to the other embodiments, the fuel residual amount detection device 48 is arranged in an extension direction of the connecting shaft 45, i.e., so that the arm portion 482 can rotate in the forward or backward directions about a left-to-right central axis. However, according to the embodiment shown in FIG. 12, the fuel residual amount detection device 48 is configured so that the orientation is changed about 90 degrees to the right. Therefore, unlike any other embodiment, the arm portion 482 is arranged so as to extend in the leftward and rightward directions, while the float 483 is formed to extend at the right side of the base portion 42. The float 483 can move in accordance with the liquid level of fuel as indicated by a void arrow.

Figure 12:
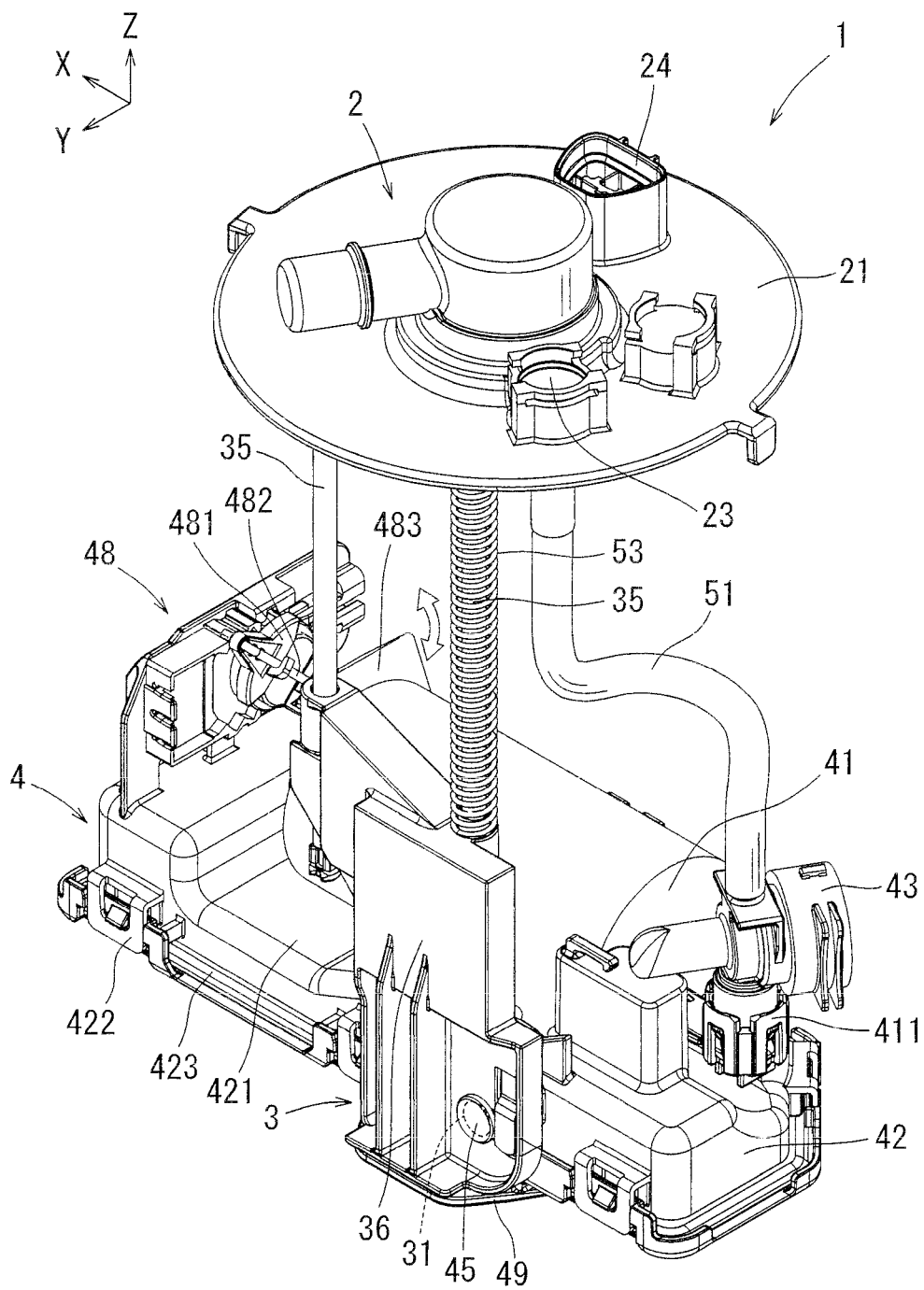
FIG. 12 is a perspective view of a fuel supply device according to another embodiment.

According to the embodiment shown in FIG. 12, since the base portion 42 is configured to abut the bottom surface portion 73 of the fuel tank 7, the fuel residual amount detection device 48 is arranged in a position above one end of the base portion 42 when the fuel supply device 1 is lifted. As a result, the float 483 is prevented from abutting to the bottom surface portion 73 of the fuel tank 7.

Figure 13:
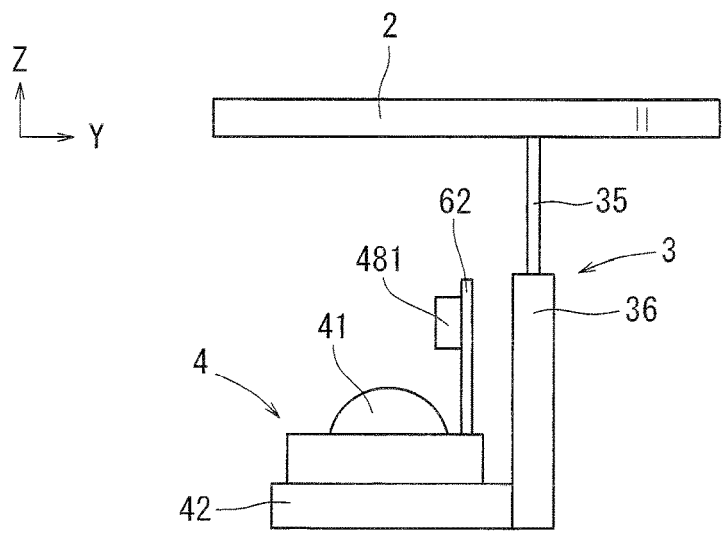
FIG. 13 is a schematic front view of a fuel supply device.
Figure 14:
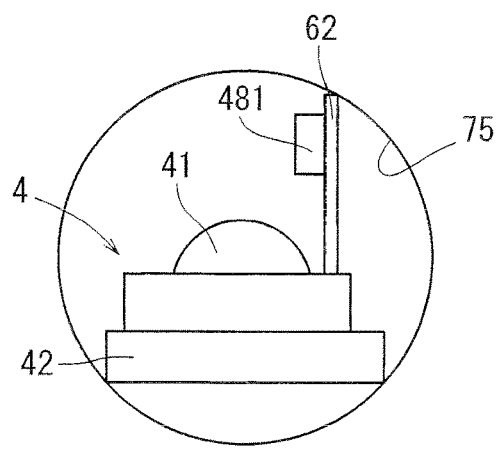
FIG. 14 is a bottom view as seen from the inside of the fuel tank for illustrating a relationship between the pump unit and an opening portion of the fuel tank according to the embodiment of FIG. 13.

The embodiment shown in FIGS. 13 and 14 will be described as follows. The difference from the embodiment shown in FIGS. 1 to 3 is that the protruding portion 62 adopted in the embodiment shown in FIGS. 13 and 14 is an alternative to the protruding portion 61 shown in FIGS. 1 to 3. Hereinafter, the above-mentioned difference will be mainly described. While the protruding portion 61 according to the embodiment shown in FIGS. 1 to 3 includes the cover portion 611 having an L-shaped configuration in side view, the cover portion 611 is not adopted in the embodiment of FIGS. 13 and 14. The protruding portion 62 according to the embodiment of FIGS. 13 and 14 is configured such that the plate-like portion extends in a direction substantially orthogonal to the bottom surface of the base portion 42. Even the protruding portion 62 may serve to restrict the movement of the pump unit 4 with respect to the circular opening portion 72 as shown in FIG. 14.

Figure 15:
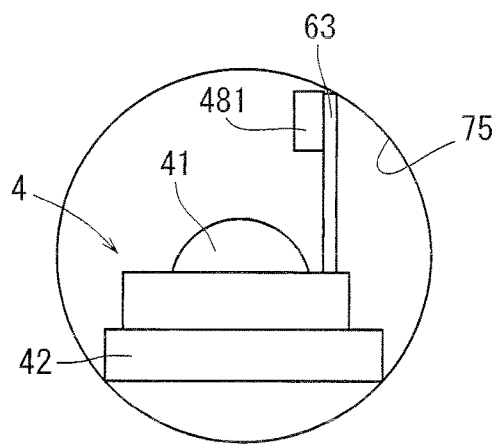
FIG. 15 is a bottom view as seen from the inside of the fuel tank for illustrating a relationship between the pump unit, to which a gauge main body of the embodiment of FIG. 14 is modified to be arranged, and an opening portion of the fuel tank.

The gauge main body 481 of the fuel residual amount detection device 48 is attached to the protruding portion 62 in the embodiment of FIGS. 13 and 14. However, the gauge main body 481 is attached to a lateral surface closer to a center of the pump unit 4 of the protruding portion 62. More specifically, the protruding portion 62 is placed closer to an outer circumferential side of the pump unit 4 than the gauge main body 481 when the fuel tank 7 is attached in a plane view. The leading end of the protruding portion 62 is configured to be further vertically away upward from the base portion 42 than the gauge main body 481 in FIG. 14. However, it is possible to configure the gauge main body 481 such that it is placed further upward from the base portion 42 than the leading end of the protruding portion 63 as shown in FIG. 15.

Figure 16:
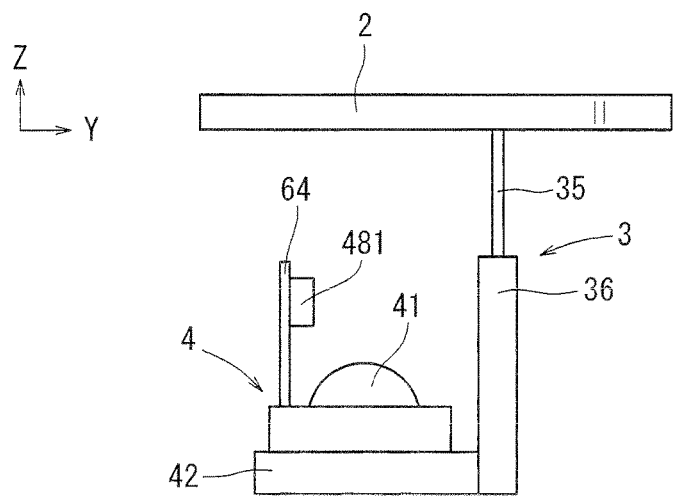
FIG. 16 is a schematic front view of a fuel supply device according to another embodiment.
Figure 17:
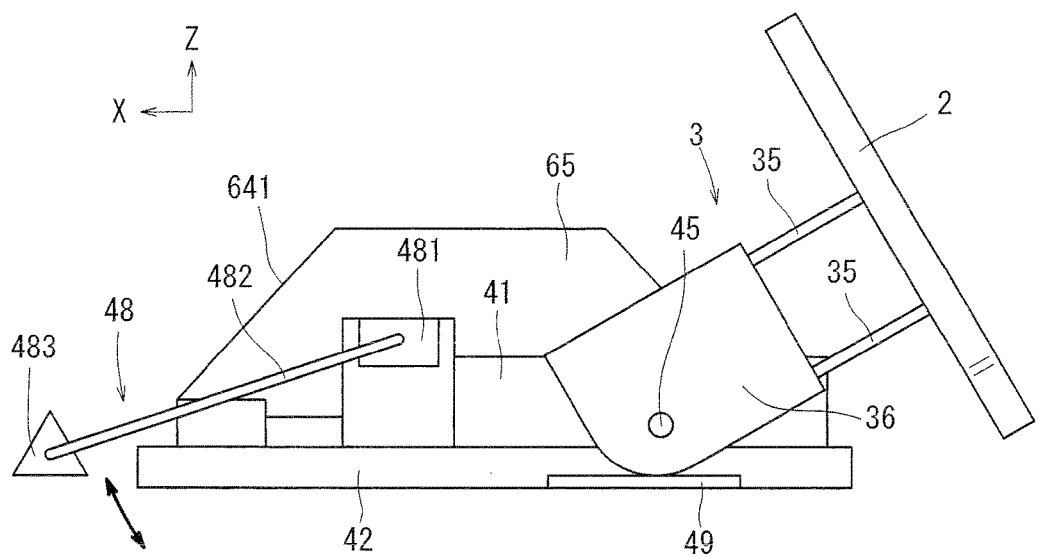
FIG. 17 is a schematic left side view of a fuel supply device according to another embodiment.
Figure 18:
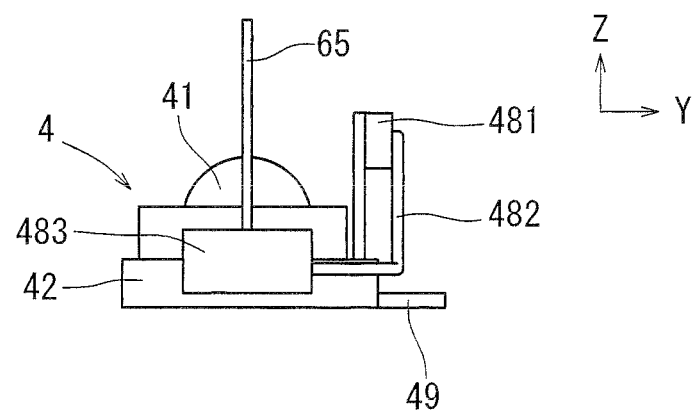
FIG. 18 is a schematic front view of the fuel supply device of FIG. 17.
Figure 19:
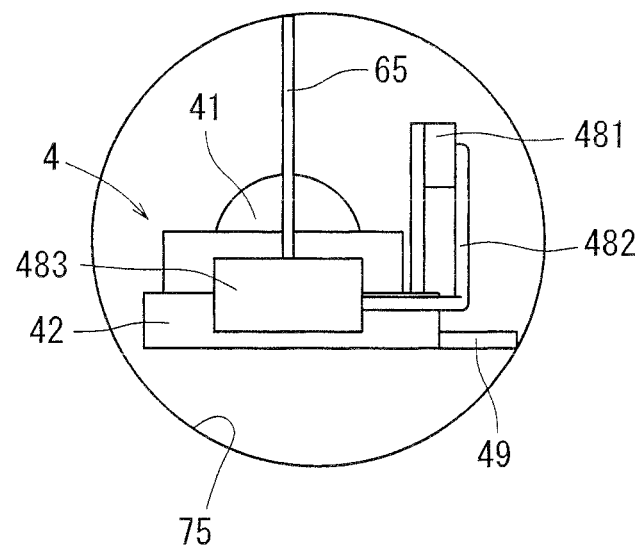
FIG. 19 is a bottom view as seen from the inside of the fuel tank for illustrating a relationship between the pump unit and an opening portion of the fuel tank according to the embodiment of FIG. 17.
Figure 20:
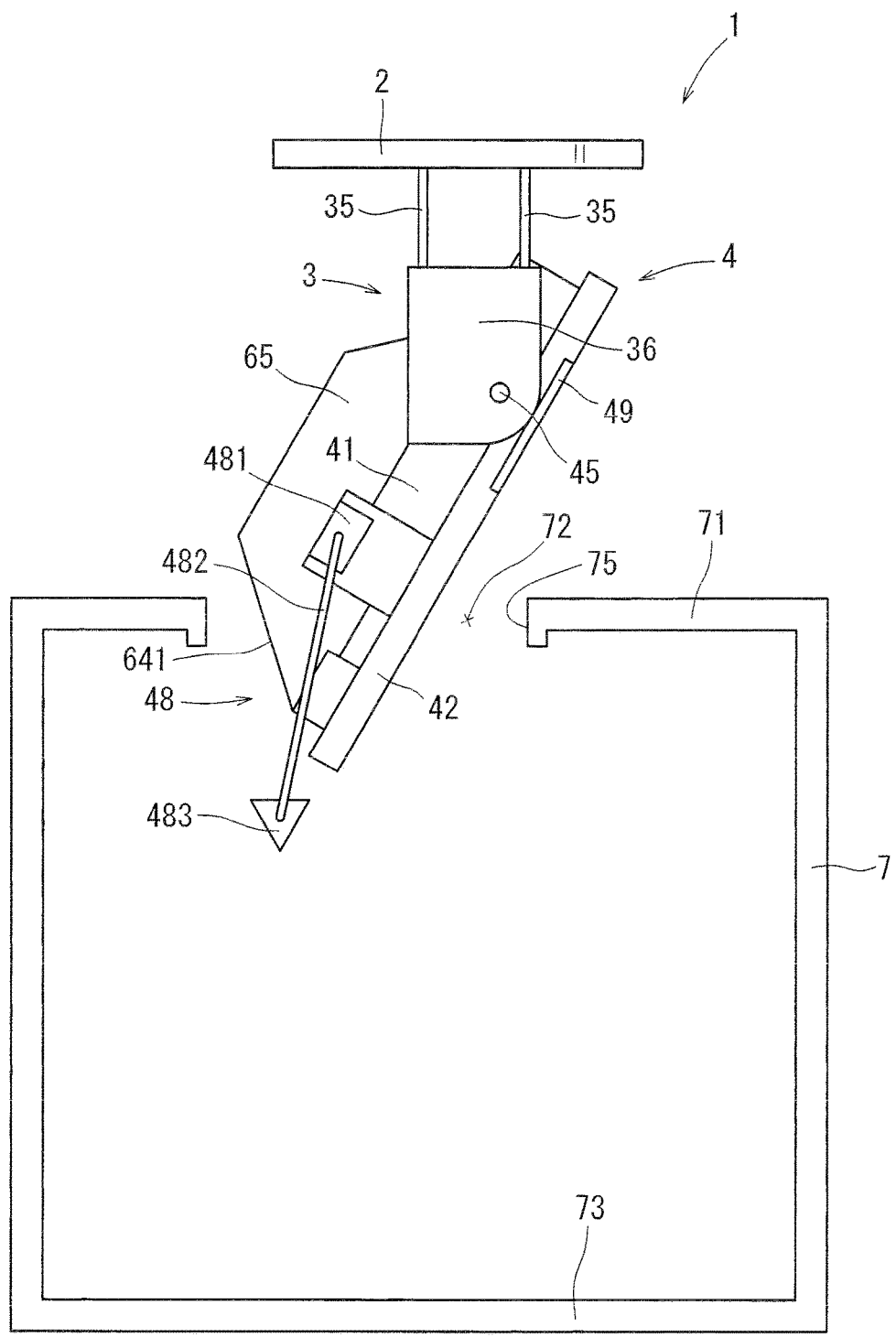
FIG. 20 is a schematic view illustrating in a state wherein the fuel supply device of FIG. 17 is inserted into a fuel tank.

The embodiment shown in FIG. 16 will be described as follows. The embodiment shown in FIG. 16 includes a protruding portion 64, which is placed in a position different from that of the previous embodiment's protruding portion 62. Hereinafter, this difference will be mainly described. According to the embodiment shown in FIGS. 13 and 14, the protruding portion 62 is arranged on the same side as the connecting portion 3 of the pump unit 4. However, on the contrary, according to the embodiment shown in FIG. 16, the protruding portion 64 is placed on the opposite side from the connecting portion 3. As in the embodiment of FIGS. 13 and 14, in the embodiment of FIG. 16 also the protruding portion 64 is placed in a position closer to the outer circumferential side of the pump unit 4 than the gauge main body 481. Thus, in a similar manner to the embodiment of FIGS. 13 and 14, hereto the gauge main body 481 is prevented from abutting the edge 75 around the opening portion 72 since the protruding portion 64 restricts a movable range of the pump unit 4.

The embodiment shown in FIGS. 17 to 20 will be described as follows. This embodiment includes a protruding portion 65, which is placed in a different position than that of the previous embodiment's protruding portion 64. Hereinafter, this difference will be mainly described. According the embodiment of FIGS. 17 to 20, the protruding portion 65 is provided integrally separate from an attachment portion for the gauge main body 481. The protruding portion 65 is placed closer to the center of the pump unit 4 in the horizontal leftward and rightward directions such that the leading end of the protruding portion 65 is positioned above the pump 41.

The protruding portion 65 according to the embodiment shown in FIGS. 17 to 20 is also restricts the movable range of the pump unit 4, with respect to the opening portion 72. This in turn prevents the gauge main body 481 from abutting the edge around the opening portion 72 of the fuel tank 7 (see FIG. 19).

The shape of protruding portion 65 according to the embodiment shown in FIGS. 17 to 20 may also serve as a guide, which can be used to insert the fuel supply device 1 into the fuel tank 7. The pump unit 4 is first inserted into the opening portion 72 when inserting the fuel supply device 1 into the fuel tank 7 (see FIG. 20). An inclined surface 641 is provided as a guide portion part of the protruding portion 65, where the guide portion is designed to be at an incline with respect to the plane in which the bottom surface of the base portion 42 extends, enabling the pump unit 4 to move smoothly without rendering the pump unit 4 unmovable during insertion, through movement of the guide portion while the guide portion abuts the edge around the opening portion 72 when the pump unit 4 is inserted through the opening portion 72.

While the embodiments of invention have been described with reference to specific configurations, it will be apparent to those skilled in the art that many alternatives, modifications and variations may be made without departing from the scope of the present invention. Accordingly, embodiments of the present invention are intended to embrace all such alternatives, modifications and variations that may fall within the spirit and scope of the appended claims. Embodiments of the present invention should not be limited to the representative configurations, but may be modified, for example, as described below.

For example, a canister portion filled with an adsorbent may be provided at the cover member. In this case, a connecting portion can be configured to connect the canister portion and the pump unit. Alternately, although the cover member may be provided with the canister portion, the connecting portion may be configured to connect the set plate portion and the pump unit.

Additionally, it is not necessary for the filter member to be arranged at the base portion. It is possible for a base portion configuration to not have the filter member. In this case, instead of the base portion, the filter member may be arranged at another portion. If the fuel to be sucked by the pump is maintained in a clean state, the filter member itself does not have to be present in the fuel supply device.

The configuration for movably connecting the connecting portion relative to the pump unit is not limited to the connection by inserting the connecting shaft provided to the pump unit into the connecting hole formed in the connecting portion. Alternatively, it is also possible to configure the connection by inserting the connecting shaft provided to the connecting portion into the connecting hole formed in the pump unit.

The protruding portion provided for protecting the gauge main body may have a configuration other than the plate-like configuration, such as a rod. Further, the protruding portion does not need to be a single portion, such as where it is also possible to protect the gauge main body due to an interaction by providing a plurality of protruding portions.

Moreover, as per the vehicle, the invention is not limited in scope to automobiles. It may also be used in a vehicle that flies in the air (e.g. an airplane or a helicopter), or a vehicle that moves over the sea or submerged in the sea (e.g. a ship or a submarine).

The invention claimed is:

1. A fuel supply device comprising:
a cover member which attaches to an opening portion of a fuel tank;
a pump unit comprising a pump and a base portion;
a connecting portion which connects the cover member and the pump unit, where the pump unit is rotatably connected to said connecting portion; and
a fuel residual amount detection device which is attached to the pump unit and is configured to detect the residual amount of fuel,
wherein the fuel residual amount detection device includes a gauge main body to which electric wirings are connected, an arm portion which is movably mounted relative to the gauge main body, and a float which is attached to a leading end of the arm portion,
the pump unit hangs down from the connection portion while the float hangs down form the pump unit along with the arm portion, and the float is positioned above a lower terminal end of the base portion of the pump unit when the cover member is held and lifted to be in a horizontal state while the pump unit is rotatable with respect to the connecting portion.

2. The fuel supply device of claim 1, wherein
the connecting portion connects the pump unit and the cover member such that the distance therebetween can be varied by moving at least one part of the connecting portion.

3. The fuel supply device of claim 1, wherein
the pump unit is movably connected relative to the connecting portion through a structure comprising a connecting shaft formed as part of either one of the connecting portion or the pump unit, and a connecting hole which is formed on the other of the connection portion and pump unit, where said connecting shaft is inserted into said connecting hole.

4. The fuel supply device of claim 1, wherein
the opening portion is circular or oval in shape;
the pump unit includes a protruding portion extending in a direction intersecting the bottom surface of the pump unit; and
the gauge main body is prevented from abutting an edge around the opening portion during insertion into the fuel tank because of the presence of the protruding portion, which upon insertion restricts a movable range of the pump unit disposed within the opening portion of the fuel tank, which in turn restricts the movable range of the gauge main body.

5. The fuel supply device of claim 4, wherein
the gauge main body is attached to a lateral surface of the protruding portion which is provided at the pump unit, and
the protruding portion is placed in a position closer to an outer circumferential side of the base portion than the gauge main body.

6. A fuel supply device comprising,
a cover member which attaches to an opening portion of a fuel tank;
a pump unit comprising a pump and a base portion;
a connecting portion which connects the cover member and the pump unit, where the pump unit is rotatably connected to said connecting portion; and
a fuel residual amount detection device which is attached to the pump unit and is configured to detect the residual amount of fuel;
wherein the fuel residual amount detection device includes a gauge main body to which electric wirings are connected, an arm portion which is movably mounted relative to the gauge main body, and a float which is attached to a leading end of the arm portion,
wherein the float is positioned above a lower terminal end of the base poriton of the pump unit when the cover member is held and lifted while the pump unit is rotatable with respect to the connecting portion;
wherein the opening portion is circular or oval in shape;
wherein the pump unit includes a protruding portion extending in a direction intersecting the bottom surface of the pump unit,
wherein the gauge main body is prevented from abutting an edge around the opening poriton during insertion into the fuel tank because of the presence of the protruding portion, which upon insertion restricts a movable range of the pump unit disposed within the opening portion of the fuel tank, which in turn restricts the movable range of the gauge main body; and
wherein the gauge main body attached to a lateral surface of the protruding portion which is provided at the pump unit,
the protruding portion includes a cover portion, and
the gauge main body is disposed between the cover portion and the base portion.

7. The fuel supply device of claim 4, wherein the protruding portion extends in a front-vertical X-Z plane orthogonal with respect to the bottom surface of the base portion, which lies in a horizontal flat or non-vertical X-Y plane, where the protruding portion is integrally separate and not attached to the gauge main body, wherein the protruding portion is placed at the center of the base portion in the Y direction, and where the shape in the X-Z plane is trapezoidal, with one or more inclined surfaces serving as a guide portion, where the guide portions are inclined with respect to the plane in which the bottom surface of the base portion extends.

8. A fuel supply device comprising:
a cover member which attaches to an opening portion of a fuel tank;
a pump unit comprising a pump and a base portion;
a connecting portion which connects the cover member and the pump unit, where the pump unit is rotatably connected to said connecting portion; and
a fuel residual amount detection device which is attached to the pump unit and is configured to detect the residual amount of fuel,
wherein the fuel residual amount detection device includes a gauge main body to which electric wirings are connected, an arm portion which is movably mounted relative to the gauge main body, and a float which is attached to a leading end of the arm portion,
the opening portion is circular or oval in shape;
the pump unit includes a protruding portion extending in a direction intersecting the bottom surface of the pump unit; and
the gauge main body is prevented from abutting an edge around the opening portion during insertion into the fuel tank because of the presence of the protruding portion, which upon insertion restricts a movable range of the pump unit disposed within the opening portion of the fuel tank, which in turn restricts the movable range of the gauge main body,
wherein the gauge main body is attached to a lateral surface of the protruding poriton which is provided at the pump unit,
the protruding portion includes a cover portion, and
the gauge main body is disposed between the cover portion and the base poriton.

9. The fuel supply device of claim 8, wherein
the gauge main body is attached to a lateral surface of the protruding portion which is provided at the pump unit, and
the protruding portion is placed closer to the outer periphery of the base portion than the gauge main body.

10. The fuel supply device of claim 8, wherein said cover portion of the protruding portion also extends from the pump unit, and is oriented such that said cover portion is perpendicular to the lateral surface of the protruding portion, such that said cover portion is configured in an upside-down L-shape as seen from a side view.

11. The fuel supply device of claim 8, wherein the protruding portion extends in a front-vertical X-Z plane orthogonal with respect to the bottom surface of the base portion, which lies in a horizontal flat or non-vertical X-Y plane, where the protruding portion is integrally separate and not attached to the gauge main body, wherein the protruding portion is placed at the center of the base portion in the Y direction, and where the shape in the X-Z plane is trapezoidal, with one or more inclined surfaces serving as a guide portion, where the guide portions are inclined with respect to the plane in which the bottom surface of the base portion extends.

* * * * *